(12) United States Patent
Mizuno et al.

(10) Patent No.: US 6,369,151 B1
(45) Date of Patent: Apr. 9, 2002

(54) RUBBER COMPOSITION FOR TIRE TREAD

(75) Inventors: Yoichi Mizuno, Osaka; Mamoru Uchida, Akashi, both of (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 09/421,520

(22) Filed: Oct. 20, 1999

(30) Foreign Application Priority Data

Oct. 27, 1998 (JP) ............................................. 10-305700

(51) Int. Cl.$^7$ ................................ C08J 3/02; C08J 5/00; C08L 15/00
(52) U.S. Cl. ........................ 524/492; 524/495; 524/571; 524/573; 152/209.1
(58) Field of Search ................................ 524/495, 571, 524/573, 492; 523/200, 203, 215, 213; 152/209.1

(56) References Cited

U.S. PATENT DOCUMENTS 4,820,751 A * 4/1989 Takeshita et al. ............ 523/215
6,172,154 B1 * 1/2001 Brown et al. ................ 524/495

FOREIGN PATENT DOCUMENTS

| JP | 2788212 | | 6/1998 |
| WO | WO-96/37546 | * | 11/1996 |
| WO | WO9637546 | | 11/1996 |
| WO | WO9637547 | | 11/1996 |
| WO | WO-96/37547 | * | 11/1996 |
| WO | WO9845361 | | 10/1998 |
| WO | WO-98/45361 | * | 10/1998 |

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

The present invention provides a rubber composition for tire tread having compatibility between low fuel consumption and abrasion resistance, especially abrasion resistance under severe condition. The rubber composition for tire tread is obtained by adding carbon black containing silica as 10 to 55 parts by weight based on a rubber component of 100 parts by weight and silica coupling agent of 2 to 8% by weight based on the carbon black containing silica.

2 Claims, 3 Drawing Sheets

RUBBER COMPOSITION FOR TIRE TREAD

BACKGROUND OF THE INVENTION

The present invention relates to a rubber composition for tire tread having compatibility between low fuel consumption and abrasion resistance, especially abrasion resistance under severe condition.

Recently a tire for low fuel consumption has been developed by decreasing rolling resistance to meet a demand for low fuel consumption of vehicle for prevention of global warming. In order to decrease the rolling resistance, it is general to lower hysteresis of a rubber composition for tire tread. As one of the method solving thereof, there are a method of decreasing an amount of carbon black as a reinforcing agent in a rubber composition for a tire and a method of substituting silica for carbon black as a reinforcing agent.

However, in tread of a heavy duty tire employed for a truck or bus tire, the abrasion resistance becomes remarkably low with decreasing an amount of carbon black. And it is a problem that a tire obtained by employing silica is low in abrasion resistance under severe condition.

As one of measures, there have been investigated a method of changing a vulcanizing accelerator or increasing an amount of a vulcanizing accelerator. But they are not sufficient, since there arises a problem that rubber property after vulcanization changes.

As the other measure, carbon black surface-treated with silica has been developed, wherein silica adheres to carbon black and the carbon black has characteristics of both carbon black and silica as fillers, and there was disclosed a rubber composition for tire tread obtained by mixing the surface-treated carbon black with a rubber component in Japanese Patent No. 2788212 specification, but there is a problem that the performance thereof is not sufficient.

In order to solve the above-mentioned problems, in case of the surface-treated carbon black used in the composition described in the above-mentioned publication, it is thought that the effect obtained by employing the carbon black was not sufficiently revealed, since the surface of carbon black was coated with silica, an active point of the carbon black was lost, and the property thereof was approximately equal to that in sole use of silica.

Therefore, the effect thereof is thought to be more effective than the carbon black surface-treated silica, if the carbon black is employed, wherein carbon black and silica are three-dimensionally mixed in one particle and the surface of the particle has two regions of silica region and carbon black region.

SUMMARY OF THE INVENTION

According to the above-mentioned views, it has been found out to prepare a tire having compatibility between low fuel consumption and abrasion resistance under severe condition by adding a prescribed amount of carbon black containing silica, wherein the silica is three-dimensionally entangled with carbon black in one particle, to a rubber composition for tire tread, particularly tread for a truck or bus tire under severe running condition.

Namely, the present invention relates to a rubber composition for tire tread comprising 100 parts by weight of a rubber component, 10 to 55 parts by weight of carbon black containing silica and 2 to 8% by weight of a silane coupling agent based on the carbon black containing silica.

The rubber composition for tire tread, which comprises 5 to 50 parts by weight of carbon black, wherein a total amount of the carbon black and the carbon black containing silica is 40 to 60 parts by weight, The rubber composition for tire tread, which comprises 5 to 50 parts by weight of silica, wherein a total amount of the silica and the carbon black containing silica is 40 to 60 parts by weight and an amount of the silane coupling agent is a total amount of 2 to 8% by weight based on the carbon black containing silica and 6 to 12% by weight based on the silica, A heavy duty tire, which is obtained by employing the rubber composition for tire tread, The rubber composition for tire tread, which comprises 5 to 50 parts by weight of carbon black and silica, wherein a total amount of the carbon black, the silica and the carbon black containing silica is 40 to 60 parts by weight and an amount of the silane coupling agent is a total amount of 2 to 8% by weight based on the carbon black containing silica and 6 to 12% by weight based on the silica, and A heavy duty tire, which is obtained by employing the rubber composition for tire tread.

DETAILED DESCRIPTION

There is no particular limitation for the rubber component employed in the present invention, as long as it have been conventionally employed in tire tread.

Examples thereof are, for example, a natural rubber (NR), various kinds of a butadiene rubber (BR), various kinds of a styrene-butadiene copolymer rubber (SBR), a polyisoprene rubber (IR), a butyl rubber (IIR), an acrylonitrile-butadiene rubber, a chloroprene rubber, an ethylene-propylene copolymer rubber, an ethylene-propylene-diene copolymer rubber, a styrene-isoprene copolymer rubber, a styrene-isoprene-butadiene copolymer rubber, an isoprene-butadiene copolymer rubber, a chlorosulfonated polyethylene, an acrylic rubber, an epichlorohydrin rubber, a polysulfide rubber, a silicone rubber, a fluororubber and a urethane rubber, and the like. These may be employed solely or in a combination use of two or more thereof. There is no particular limitation for a blend ratio thereof. NR, BR, SBR and IR are preferably used from the viewpoint of obtaining abrasion resistance of the rubber composition for tread suitable for use in a truck or bus tire under severe running condition.

Carbon black containing silica (hereinafter referred to as "CB containing silica") employed in the present invention is a particle, wherein both carbon black and silica are three-dimensionally entangled in one particle and exposed on the surface of a particle as mentioned above. Since the CB containing silica has the above-mentioned structure, it has carbon black region, which has a few functional groups on the surface and low capability of chemically bonding to a polymer, and silica region, which has many functional groups on the surface and capability of chemically bonding to a polymer through a bonding or coupling agent to lower hysteresis. It becomes possible to obtain tread for a truck or bus tire having compatibility between decrease of rolling resistance (low fuel consumption) and abrasion resistance under severe condition by employing carbon black containing silica, which is prepared by mixing carbon black having high abrasion resistance with silica and is highly capable of chemically bonding to a polymer.

Figure 1:
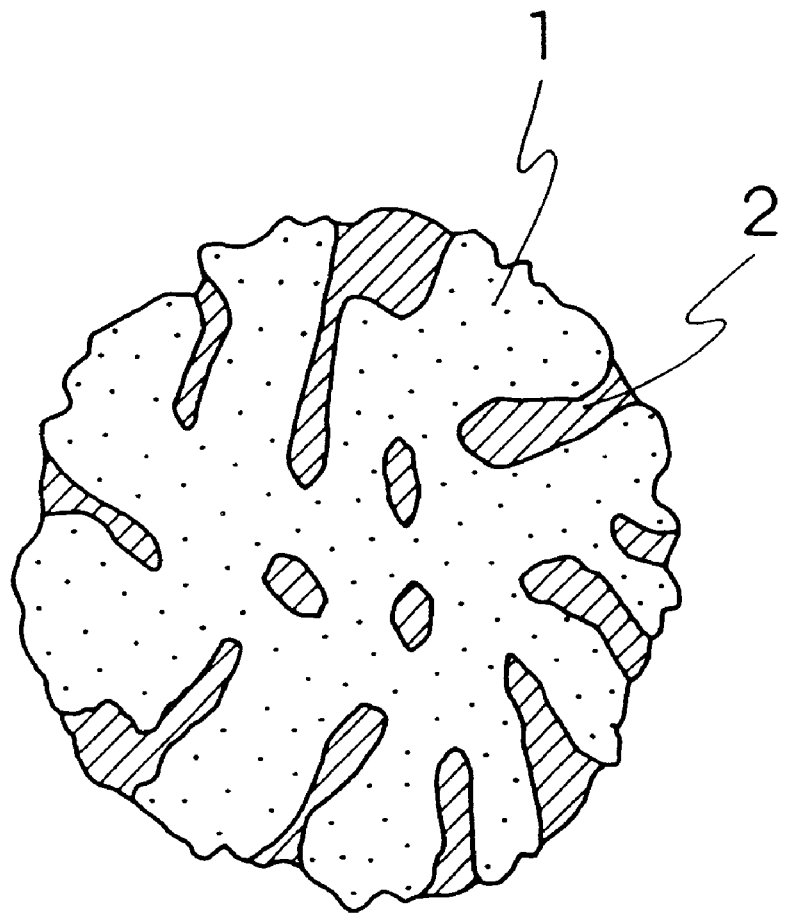
FIG. 1 is a diagram of a particle in which carbon black and silica are three-dimensionally mixed in one particle.
Figure 2:
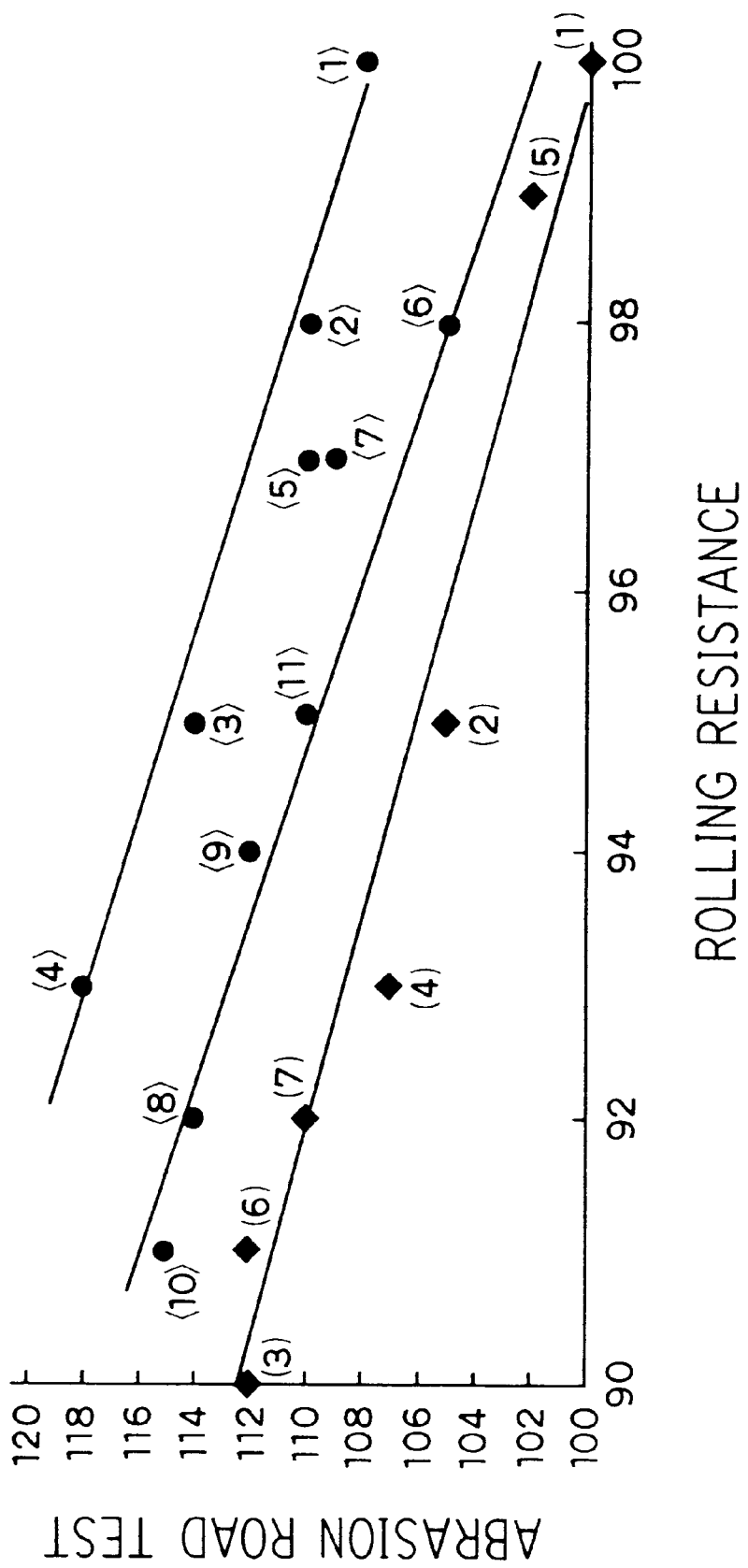
FIG. 2 is a graph showing relation between rolling resistance and abrasion road test in Examples 1 to 11 and Comparative Examples 1 to 7.

FIG. 1 is a diagram of a particle in which carbon black and silica are three-dimensionally mixed in one particle. In the FIGS. 1, 1 and 2 show carbon region and silica region, respectively.

In the CB containing silica, both carbon region and silica region have region exposed to the surface of a particle, so that almost all of the carbon black region is not coated with silica. It is different from the case of the carbon black surface-treated with silica. Therefore, abrasion resistance under severe condition, which is a characteristic of the composition using carbon black, becomes sufficiently excellent. And it is possible to lower rolling resistance, since CB containing silica has more surface active points than the conventional carbon black and then bound rubber is increased.

There is no particular limitation for a preparation process of the CB containing silica, an one-step preparation process by simultaneously reacting an organosiloxane with material oil is preferably available. The above-mentioned preferable process was disclosed in, for example, WO 96/37547 in detail.

Mixture ratio of silica and carbon black in CB containing silica is preferably 0.1 to 25% by weight, more preferably 0.5 to 10% by weight and particularly 2 to 6% by weight from the viewpoint of revealing characteristics of both carbon black and silica in a good balance.

Carbon black employed in the present invention is a component to ensure reinforcement.

There is no particular limitation for the above-mentioned carbon black, for example, carbon black generally used for a conventional rubber as an additive may be employed. Examples thereof are furnace black, acetylene black, thermal black, channel black, graphite and the like.

Silica employed in the present invention is a component to ensure reinforcement.

As the above-mentioned silica, silica generally used for a conventional rubber as an additive may be employed. Examples thereof are, for example, anhydrous silica, hydrous silica, colloidal silica and precipitated silica disclosed in Japanese Unexamined Patent Publication No.62838/1985. They can be employed solely or in a combination use of two or more thereof.

There is no particular limitation for a specific surface area of the above-mentioned silica, for example, a specific surface area for CTAB adsorption (hereinafter referred to as CTAB) is preferably 100 to 200 $m^2/g$ and a specific surface area for BET nitrogen adsorption (hereinafter referred to as BET) is preferably 100 to 250 $m^2/g$.

Examples of the above-mentioned silica are, for example, Nipsil VN3 (available from Nippon Silica Co. Ltd.; CTAB 144 $m^2/g$; BET 210 $m^2/g$), Nipsil AQ (available from Nippon Silica Co. Ltd.; CTAB 150 $m^2/g$; BET 227 $m^2/g$), Ultrasil VN 3 (available from Deggusa Co., Ltd.; CTAB 165 $m^2/g$; BET 172 $m^2/g$) and the like.

Mixture amounts of the CB containing silica, the carbon black and the silica based on the above-mentioned rubber component are 10 to 55 parts by weight, preferably 20 to 45 parts by weight, of the CB containing silica, 40 to 60 parts by weight, preferably 45 to 55 parts by weight, of a total amount of the carbon black and/or the silica and the CB containing silica. Abrasion resistance becomes low with decreasing an amount of the CB containing silica, since the above-mentioned efficiency is not sufficiently obtained by employing the CB containing silica. Rolling resistance of a tire becomes high with increasing an amount of the CB containing silica. And abrasion resistance become low with decreasing a total amount of the carbon black and/or silica and the CB containing silica, and rolling resistance becomes high with increasing the total amount.

A total amount of the carbon black and/or the silica and the CB containing silica is 40 to 60 parts by weight. An amount of the carbon black and/or silica may be 0 part by weight, since an amount of the CB containing silica is 10 to 55 parts by weight. In an amount of carbon black and/or silica, an amount of carbon black is 0 to 45 parts by weight, preferably 5 to 45 parts by weight, particularly 10 to 35 parts by weight and/or an amount of the silica is 0 to 45 parts by weight, preferably 5 to 50 parts by weight, particularly 10 to 35 parts by weight, so that an amount of the CB containing silica is 10 to 55 parts by weight, preferably 20 to 45 parts by weight, and an amount of the carbon and/or silica and the CB containing silica is 40 to 60 parts by weight, preferably 45 to 55 parts. Rolling resistance tends to become high with increasing the amount of the carbon black, and abrasion resistance tends to become low with increasing the amount of the silica. Preferably, the amount of the carbon black is at least 10 parts by weight from the viewpoint of abrasion resistance, and the amount of the silica is at least 10 parts by weight from the viewpoint of rolling resistance.

Abrasion resistance, rolling resistance and the like may be improved by further adding a silane coupling agent to the rubber composition of the present invention for tire tread comprising a rubber component, CB containing silica and carbon black and/or silica as an option.

Examples of the above-mentioned silane coupling agent is, for example, vinyltrichlorosilane, vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, bis[3-(triethoxysilyl)propyl]tetrasulfene and the like. These can be employed solely or in a combination use of two or more thereof. Among them, bis[3-(triethoxysilyl)propyl]tetrasulfene or the like is preferable.

An amount of the above-mentioned silane coupling agent is a total amount of 2 to 6% by weight, preferably 3 to 5% by weight, based on the CB containing silica and 6 to 10% by weight, preferably 7 to 9% by weight, based on the silica. If the amount of the silane coupling agent is smaller than the total amount of the above-mentioned minimum, performances such as abrasion resistance and rolling resistance tend to lower. And it is undesirable to use a larger amount of silane coupling agent than the total amount of the above-mentioned maximum from the viewpoint of cost.

In the composition of the present invention, a composition comprising at least a rubber component, CB containing silica, silica, carbon black and a silane coupling agent is the most preferable.

In the composition, an amount of CB containing silica is 10 to 55 parts by weight, preferably 10 to 40 parts by weight and particularly 10 to 30 parts by weight based on 100 parts by weight of a rubber component. If the amount of the CB containing silica is at most 10 parts by weight, abrasion resistance is low. And if the amount is at least 55 parts by weight, rolling resistance is excellent, but abrasion resistance is low.

A total amount of CB containing silica, silica and carbon black is 40 to 60 parts by weight, preferably 45 to 55 parts by weight. If the amount is less than 40 parts by weight, rolling resistance is excellent, but abrasion resistance is very low. On the contrary, if the amount is more than 60 parts by weight, abrasion resistance is excellent, but rolling resistance increases.

An amount of the silane coupling agent is a total amount of 2 to 8% by weight based on carbon black containing silica and 6 to 12% by weight based on silica, preferably 3 to 8% by weight based on carbon black containing silica and 7 to 12% by weight based on silica. If the amount of the silane coupling agent is too small, both abrasion resistance and rolling resistance are not sufficient. And if the amount is too large, abrasion resistance is low without efficiency obtained by adding the coupling agent.

To the composition of the present invention, there can be added conventional components and additives generally employed in the preparation process of a rubber composition for tire tread in addition to the above-mentioned components in a suitable amount. Examples thereof are, for example, process oil (paraffin process oil, naphthene process oil, aromatic process oil), a vulcanizing agent (sulfur, a chlorinated sulfur compound, an organic sulfur compound and the like), a vulcanization accelerator (guanidine type, an aldehyde-amine type, an aldehyde-ammonia type, a thiazole type, a sulfeneamide type, a thiourea type, a thiuram type, a dithiocarbamate type, Xanthates compound), a crosslinking agent (a radical generator such as an organic peroxide compound or an azo compound, an oxime compound, a nitroso compound, a polyamine compound and the like), a reinforcing agent (a high-styrene resin, a phenol-formaldehyde resin and the like), an antioxidant or an antiaging agent (an amine derivative such as a diphenylamine type or a p-phenylenediamine type, a quinoline derivative, a hydroquinone derivative, monophenols, diphenols, thiobisphenols, hindered phenols, phosphorous acid esters), a wax, stearic acid, zinc oxide, a softening agent, a filler, a plasticizer and the like.

Preferably the composition of the present invention can be suitably employed for a heavy duty tire, since abrasion resistance under heavy load is particularly excellent. A heavy duty tire mean an airplane tire, a bus tire, a truck tire and the like. Among those the composition of the present invention is preferably employed for a bus tire or a truck tire from the viewpoint of severe demand for lowering rolling resistance.

EXAMPLES

The present invention is further explained in details based on the Examples concretely, but is not limited thereto.

"Parts" and "%" mean "parts by weight" and "% by weight" respectively, unless otherwise specified.

Materials used in EXAMPLES and COMPARATIVE EXAMPLES and evaluation tests are shown as follows.

NR—RSS #3 grade for general use Carbon black containing silica—CRX 2000 available from Cabot Corporation; N-234 carbon black containing 4.7% of silica; an adsorption amount of DBP: 113 cc/ 100 g; an adsorption amount of CDBP: 102 cc/100 g Silica—Ultrasil VN 3 available from Deggusa Co., Ltd.

Carbon black
  N 220 available from Mitsubishi Chemical Corporation; Diablack I (N220) of ISAF carbon
  N 351 avialable from Showa Cabot Co., Ltd.; Showblack (N351) of HAF carbon black Silane coupling agent—Si69 available from Deggusa Co., Ltd.; bis(3-triethoxysilylpropyl)tetrasulfene Antioxidant—Ozonone 6C available from Seiko Chemical Co. Ltd.

Wax—Sannowax available from Ohuchi Shinko Kagaku Kogyo Co. Ltd.

Stearic acid—Kiri available from NOF CORPORATION

Zinc oxide—Ginrei R available from Toho Zinc Co., Ltd.

Sulfur—Sulfur available from Tsurumi Chemical Co., Ltd.

Vulcanization accelerator—NOCCELER NS available from Ohuchi Shinko Kagaku Kogyo Co., Ltd.; N-tert-butyl-2-benzothiazolylsulphene amide

[Abrasion Resistance]

A vulcanized rubber was prepared from a prescribed rubber composition for tire tread. Test was carried out at surface rotating speed of 50 m/min, an amount of falling sands of 15 g/min and a slip ratio of 25% under low severe condition (load of 2.5 kg) or high severe condition (50 kg of load) by employing a Lambourn abrasion test machine made by Iwamoto Seisakusho Co., Ltd. All results were shown by employing an index based on the value in the following Comparative Example 1 as 100. If the index becomes large, the abrasion resistance becomes excellent.

[Loss Tangent (Viscoelasticity Test)]

A rubber composition for the tire tread was vulcanized at 150° C. and 20 kgf for 45 minutes to prepare a tire of 11R22.5 for a truck.

A test piece was prepared from tread of the obtained a new tire. Loss tangent (tan δ) at 60° C. was measured under condition of frequency 10 Hz and dynamic strain 1.0% by employing a viscoelasticity spectrometer made by Iwamoto Seisakusyo Co., Ltd. If tan δ becomes low, the performance becomes excellent and low-fuel efficiency becomes possible.

[Hardness]

Tread hardness of a new tire was measured at 25° C. by employing a JIS-A hardness meter.

[Rolling Resistance]

The rolling resistance of a tire prepared in the same process as in the Loss tangent test was measured at a rate of 80 km/h, load of 30 kN and internal pressure of 800 kPa by employing a test machine made by Kobe Steel, Ltd. All results were shown by employing an index based on the value in the following Comparative Example 1 as 100. The larger the index becomes, the smaller and the more excellent the rolling resistance becomes.

[Abrasion Road Test]

A tire for truck having four-divisional tread was experimentally prepared and a 10 ton truck was equipped with the tire. After running 100000 km, residual tread was measured to compare abrasion resistance. All results were shown by employing an index based on the value in the following Comparative Example 1 as 100. The larger the index becomes, the more excellent the abrasion resistance becomes.

Examples 1 to 18 and Comparative Examples 1 to 8

A composition comprising a prescribed amount of main components shown in Table 1 to 3, 2 parts of antioxidant, 1 part of wax, 2 parts of stearic acid and 3 parts of zinc oxide was kneaded at about 150° C. for five minutes by employing a bunbury mixer. The obtained mixture was kneaded with 1 part of sulfur and 1.5 parts of a vulcanization accelerator at 80° C. for about five minutes by employing an open roll with twin screws to obtain a composition (green rubber composition for tire tread), then the composition was vulcanized at 150° C. for 45 minutes to obtain the vulcanized rubber. And abrasion resistance thereof was evaluated.

And the above-mentioned green rubber composition for tire tread was vulcanized at 150° C. and 210 kgf/cm$^2$ for 45 minutes to prepare a tire of 11R22.5 for truck. The tire was evaluated based on loss tangent, hardness, rolling resistance and abrasion road test. Tables 1 to 3 show the results.

TABLE 1

| Example No. | Com. Ex. 1 | Com. Ex. 2 | Com. Ex. 3 | Com. Ex. 4 | 1 | 2 | 3 | 4 |
|---|---|---|---|---|---|---|---|---|
| composition (parts) | | | | | | | | |
| NR | 100 | 100 | 100 | 100 | 100 | 100 | 100 | 100 |
| Carbon black containing silica | | | | | 40 | 45 | 50 | 55 |
| Silica | 45 | 5) | | | | | | |
| N220 | | | 45 | | | | | |
| N351 | | | | 45 | | | | |
| total amount of Si69 ((A) + (B)) | 3.6 | 4 | | | 1.6 | 1.8 | 2 | 2.2 |
| (A) amount of Si69 based on silica | 3.6 | 4 | | | | | | |
| (Si69 % based on silica) | (8) | (8) | | | | | | |
| (B) amount of Si69 based on carbon black containing silica | | | | | 1.6 | 1.8 | 2 | 2.2 |
| (Si69 % based on carbon black containing silica) | | | | | (4) | (4) | (4) | (4) |
| evaluation results | | | | | | | | |
| abrasion resistance | | | | | | | | |
| low severe condition | 100 | 113 | 115 | 105 | 110 | 116 | 123 | 130 |
| high severe condition | 100 | 110 | 125 | 117 | 112 | 121 | 130 | 139 |
| loss tangent | 0.098 | 0.112 | 0.13 | 0.118 | 0.095 | 0.107 | 0.117 | 0.124 |
| hardness (JIS-A) | 64 | 66 | 67 | 65 | 63 | 65 | 67 | 70 |
| rolling resistance | 100 | 95 | 90 | 93 | 100 | 98 | 95 | 93 |
| abrasion road test | 100 | 105 | 112 | 107 | 108 | 110 | 114 | 118 |

TABLE 2

| Example No. | Com. Ex. 5 | 5 | 6 | 7 | Com. Ex. 6 | 8 | 9 | Com. Ex. 7 | 10 | Com. Ex. 8 | 11 |
|---|---|---|---|---|---|---|---|---|---|---|---|
| composition (parts) | | | | | | | | | | | |
| NR | 100 | 100 | 100 | 100 | 100 | 100 | 100 | 100 | 100 | 100 | 100 |
| Carbon black containing silica | 5 | 10 | 10 | 25 | 5 | 10 | 30 | 5 | 10 | 60 | 30 |
| Silica | 45 | 45 | 40 | 25 | | | | | | | 10 |
| N220 | | | | | 40 | 40 | 20 | | | | 10 |
| N351 | | | | | | | | 45 | 45 | | |
| total amount of Si69 ((A) + (B)) | 3.8 | 4 | 3.6 | 3 | 0.2 | 0.4 | 1.2 | 0.2 | 0.4 | 2.4 | 2 |
| (A) amount of Si69 based on silica | 3.6 | 3.6 | 3.2 | 2 | | | | | | | 0.8 |
| (Si69 % based on silica) | (8) | (8) | (8) | (8) | | | | | | | (8) |
| (B) amount of Si69 based on carbon black containing silica | 0.2 | 0.4 | 0.4 | 1 | 0.2 | 0.4 | 1.2 | 0.2 | 0.4 | 2.4 | 1.2 |
| (Si69 % based on carbon black) | (4) | (4) | (4) | (4) | (4) | (4) | (4) | (4) | (4) | (4) | (4) |
| evaluation results | | | | | | | | | | | |
| abrasion resistance | | | | | | | | | | | |
| low severe condition | 101 | 107 | 118 | 123 | 116 | 117 | 117 | 109 | 115 | 134 | 109 |
| high severe condition | 102 | 119 | 114 | 123 | 120 | 127 | 127 | 122 | 129 | 140 | 122 |
| loss tangent | 0.106 | 0.117 | 0.112 | 0.109 | 0.125 | 0.12 | 0.119 | 0.125 | 0.129 | 0.134 | 0.116 |
| hardness (JIS-A) | 65 | 68 | 66 | 66 | 65 | 67 | 65 | 66 | 69 | 73 | 66 |
| rolling resistance | 99 | 97 | 98 | 97 | 91 | 92 | 94 | 92 | 91 | 87 | 95 |
| abrasion road test | 102 | 110 | 105 | 109 | 112 | 114 | 112 | 106 | 115 | 119 | 110 |

TABLE 3

| Example No. | 12 | 1 | 13 | 14 | 15 | 16 | 5 | 17 | 18 |
|---|---|---|---|---|---|---|---|---|---|
| composition (parts) | | | | | | | | | |
| NR | 100 | 100 | 100 | 100 | 100 | 100 | 100 | 100 | 100 |
| Carbon black containing silica | 40 | 40 | 40 | 40 | 10 | 10 | 10 | 10 | 10 |
| Silica | | | | | 45 | 45 | 45 | 45 | 45 |
| total amount of Si69 ((A) + (B)) | 0.8 | 1.6 | 2.4 | 3.2 | 2.2 | 3.1 | 4 | 4.9 | 5.8 |
| (A) amount of Si69 based on silica | | | | | 1.8 | 2.7 | 3.6 | 4.5 | 5.4 |
| (Si69 % based on silica) | | | | | (4) | (6) | (8) | (10) | (12) |
| (B) amount of Si69 based on carbon black containing silica | 0.8 | 1.6 | 2.4 | 3.2 | 0.4 | 0.4 | 0.4 | 0.4 | 0.4 |
| (Si69 % based on carbon black) | (2) | (4) | (6) | (8) | (4) | (4) | (4) | (4) | (4) |
| evaluation results | | | | | | | | | |
| abrasion resistance | | | | | | | | | |
| low severe condition | 106 | 110 | 113 | 115 | 106 | 107 | 107 | 108 | 109 |
| high severe condition | 109 | 112 | 114 | 116 | 117 | 118 | 119 | 121 | 122 |
| loss tangent | 0.105 | 0.095 | 0.092 | 0.09 | 0.1212 | 0.119 | 0.117 | 0.114 | 0.113 |
| hardness (JIS-A) | 62 | 63 | 65 | 66 | 66 | 67 | 68 | 69 | 69 |
| rolling resistance | 98 | 100 | 102 | 102 | 95 | 96 | 97 | 99 | 100 |
| abrasion road test | 106 | 108 | 109 | 109 | 108 | 109 | 110 | 112 | 113 |

It can be seen from the comparison of Examples 1 to 4 with Comparative Examples 1 to 4 in FIG. 2 that balance between rolling resistance and abrasion resistance under severe condition of a truck tire can be improved by employing CRX2000 instead of silica and carbon black. And it can be seen from the comparison of Examples 5 to 10 with Comparative Examples 1 to 4 in FIG. 2 that both properties can be improved even if silica, carbon black and CRX2000 are employed together. On the other hand, it can be seen from Comparative Examples 5 to 7 that properties can not sufficiently improved if the amount is less than 10 parts by weight. From Examples 1 and 12 to 14, with respect to an amount of the coupling agent desired properties are obtained by adding 2 to 8% by weight thereof based on CRX2000. But addition of about 4% by weight is preferable from the viewpoint of property and cost balance. From Examples 5 and 15 to 18, desired properties are obtained by employing 4 to 12% by weight based on silica. Addition of 8% by weight is preferable from the viewpoint of property and cost balance. In FIG. 2, the number in < > and the number in ( ) show the example number and the comparative example number respectively.

Figure 3:
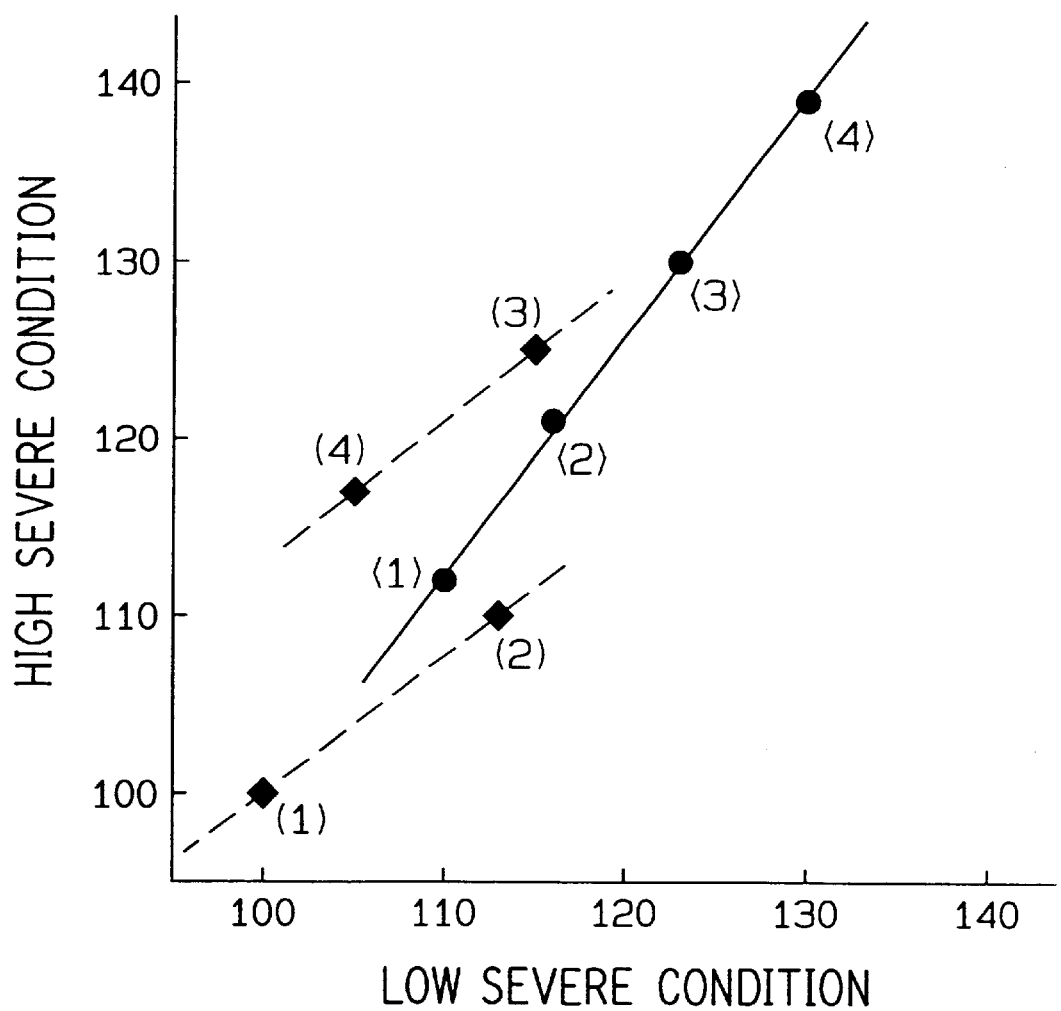
FIG. 3 is a graph showing relation of abrasion resistance under low severe condition and high severe condition in Examples 1 to 4 and Comparative Examples 1 to 4.

FIG. 3 shows a plot of abrasion resistance under high severe condition against abrasion resistance under low severe condition of Examples 1 to 4 and Comparative Examples 1 to 4. In FIG. 3, the number in < > and the number in ( ) show the example number and the comparative example number respectively. From FIG. 3, it can be seen that abrasion resistance under high severe condition is improved by employing the carbon black containing silica employed in the present invention in comparison with the case of silica. Therefore, the composition of the present invention obtained by employing the carbon black containing silica can be preferably applied to a heavy duty tire (truck or bus) employed under high severe condition.

Examples 11 and 19 to 26 and Comparative Examples 9 to 17

A composition comprising a prescribed amount of main components shown in Table 4 to 3, 2 parts of antioxidant, 1 part of wax, 2 parts of stearic acid and 3 parts of zinc oxide was kneaded at about 150° C. for five minutes by employing a bunbury mixer. The obtained mixture was kneaded with 1 part of sulfur and 1.5 parts of a vulcanization accelerator at 80° C. for about five minutes by employing an open roll with twin screws to obtain a composition (green rubber composition for tire tread), then the composition was vulcanized at 150° C. for 45 minutes to obtain the vulcanized rubber (as five components consisting of rubber component, CB containing silica, silica, carbon black and silane coupling agent). And abrasion resistance thereof was evaluated.

And the above-mentioned green rubber composition for tire tread was vulcanized at 150° C. and 20 kgf for 45 minutes to prepare a tire of 11R22.5 for truck. The tire was evaluated based on loss tangent, hardness, rolling resistance and abrasion road test. Table 4 to 5 show the results.

TABLE 4

| Example No. | Com. Ex. 9 | Com. Ex. 10 | 19 | 11 | 20 | Com. Ex. 11 | Com. Ex. 12 |
|---|---|---|---|---|---|---|---|
| composition (parts) | | | | | | | |
| NR | 100 | 100 | 100 | 100 | 100 | 100 | 100 |
| Carbon black containing silica | 5 | 8 | 15 | 30 | 40 | 55 | 60 |
| Silica | 22.5 | 20 | 17.5 | 10 | 10 | 5 | 5 |
| N220 | 22.5 | 20 | 17.5 | 10 | 10 | 5 | 5 |
| N351 | | | | | | | |
| total amount of Si69 ((A) + (B)) | 2 | 1.9 | 2 | 2 | 2.4 | 2.6 | 2.8 |
| (A) amount of Si69 based on silica | 1.8 | 1.6 | 1.4 | 0.8 | 0.8 | 0.4 | 0.4 |
| (Si69 % based on silica) | (8) | (8) | (8) | (8) | (8) | (8) | (8) |

TABLE 4-continued

| Example No. | Com. Ex. 9 | Com. Ex. 10 | 19 | 11 | 20 | Com. Ex. 11 | Com. Ex. 12 |
|---|---|---|---|---|---|---|---|
| (B) amount of Si69 based on carbon black containing silica | 0.9 | 0.8 | 0.7 | 1.2 | 0.4 | 0.2 | 0.2 |
| (Si69 % based on carbon black) | (4) | (4) | (4) | (4) | (4) | (4) | (4) |
| evaluation results | | | | | | | |
| abrasion resistance | | | | | | | |
| low severe condition | 105 | 105 | 108 | 109 | 120 | 134 | 133 |
| high severe condition | 119 | 119 | 121 | 122 | 135 | 141 | 140 |
| loss tangent | 0.118 | 0.118 | 0.116 | 0.116 | 0.123 | 0.13 | 0.144 |
| hardness (JIS-A) | 65 | 66 | 66 | 66 | 68 | 71 | 73 |
| rolling resistance | 94 | 95 | 95 | 95 | 89 | 82 | 76 |
| abrasion road test | 106 | 108 | 109 | 110 | 118 | 120 | 119 |

TABLE 5

| Example No. | Com. Ex. 13 | 21 | 22 | 11 | 23 | 24 | Com. Ex. 14 |
|---|---|---|---|---|---|---|---|
| composition (parts) | | | | | | | |
| NR | 100 | 100 | 100 | 100 | 100 | 100 | 100 |
| Carbon black containing silica | 10 | 20 | 25 | 30 | 35 | 40 | 50 |
| Silica | 10 | 10 | 10 | 10 | 10 | 10 | 10 |
| N220 | 10 | 10 | 10 | 10 | 10 | 10 | 10 |
| N351 | | | | | | | |
| total amount of Si69 ((A) + (B)) | 1.2 | 1.6 | 1.8 | 2 | 2.2 | 2.4 | 2.8 |
| (A) amount of Si69 based on silica | 0.8 | 0.8 | 0.8 | 0.8 | 0.8 | 0.8 | 0.8 |
| (Si69 % based on silica) | (8) | (8) | (8) | (8) | (8) | (8) | (8) |
| (B) amount of Si69 based on carbon black containing silica | 0.4 | 0.4 | 0.4 | 1.2 | 0.4 | 0.4 | 0.4 |
| (Si69 % based on carbon black) | (4) | (4) | (4) | (4) | (4) | (4) | (4) |
| evaluation results | | | | | | | |
| abrasion resistance | | | | | | | |
| low severe condition | 63 | 82 | 95 | 109 | 116 | 123 | 135 |
| high severe condition | 52 | 77 | 103 | 122 | 127 | 137 | 142 |
| loss tangent | 0.072 | 0.09 | 0.105 | 0.116 | 0.123 | 0.13 | 0.14 |
| hardness (JIS-A) | 52 | 61 | 64 | 66 | 68 | 70 | 73 |
| rolling resistance | 110 | 102 | 98 | 95 | 89 | 83 | 77 |
| abrasion road test | 81 | 89 | 100 | 110 | 116 | 120 | 120 |

TABLE 6

| Example No. | Com. Ex. 15 | Com. Ex. 16 | 11 | 25 | 26 | Com. Ex. 17 |
|---|---|---|---|---|---|---|
| composition (parts) | | | | | | |
| NR | 100 | 100 | 100 | 100 | 100 | 100 |
| Carbon black containing silica | 30 | 30 | 30 | 30 | 30 | 30 |
| Silica | 10 | 10 | 10 | 10 | 10 | 10 |
| N220 | 10 | 10 | 10 | 10 | 10 | 10 |
| N351 | | | | | | |
| total amount of Si69 ((A) + (B)) | 0 | 1 | 2 | 2.8 | 3.6 | 4.6 |
| (A) amount of Si69 based on silica | 0 | 0.4 | 0.8 | 1 | 1.2 | 1.6 |
| (Si69 % based on silica) | (0) | (4) | (8) | (10) | (12) | (16) |
| (B) amount of Si69 based on carbon black containing silica | 0 | 0.2 | 1.2 | 0.6 | 0.8 | 1 |
| (Si69 % based on carbon black containing silica) | (0) | (2) | (4) | (6) | (8) | (10) |

TABLE 6-continued

| Example No. | Com. Ex. 15 | Com. Ex. 16 | 11 | 25 | 26 | Com. Ex. 17 |
|---|---|---|---|---|---|---|
| evaluation results | | | | | | |
| abrasion resistance | | | | | | |
| low severe condition | 105 | 107 | 109 | 110 | 111 | 113 |
| high severe condition | 115 | 120 | 122 | 122 | 123 | 122 |
| loss tangent | 0.125 | 0.119 | 0.116 | 0.114 | 0.113 | 0.113 |
| hardness (JIS-A) | 62 | 64 | 66 | 67 | 68 | 69 |
| rolling resistance | 90 | 93 | 95 | 96 | 97 | 98 |
| abrasion road test | 104 | 107 | 110 | 110 | 112 | 112 |

As compared with Comparative Examples 11 and 12, Examples 11, 19 and 20 are excellent in rolling resistance. And Examples 11 and 21 to 24 are more excellent than Comparative Example 13 in abrasion resistance and than Comparative Example 14 in rolling resistance. Furthermore, Examples 11, 24 and 25 are more excellent than Comparative Examples 15 and 16 in both abrasion resistance and rolling resistance.

The present invention provides a rubber compostion for tire tread having compatibility between low fuel consumption and abrasion resistance, especially abrasion resistance under severe condition.

What is claimed is:

1. A rubber composition for a tire tread, which comprises 100 parts by weight of a rubber component, 10 to 55 parts by weight of carbon black containing silica, 5 to 50 parts by weight of carbon black, 5 to 50 parts by weight of silica, and a silane coupling agent, wherein the total amount of the carbon black, the silica, and the carbon black containing silica is 40 to 60 parts by weight, and said silane coupling agent is present in a total amount of from 2 to 8% by weight based on the carbon black containing silica and 6 to 12% by weight based on the silica.

2. A heavy duty tire, comprised of the rubber composition of claim 1.

* * * * *